United States Patent
Zaengle et al.

(10) Patent No.: US 8,667,014 B2
(45) Date of Patent: Mar. 4, 2014

(54) REUSABLE PACKAGING HISTORY TRACKING SYSTEM AND QUERY INTERFACE

(75) Inventors: Paul Zaengle, Beaverton, OR (US); Jason Sinks, Hawthorne, NY (US)

(73) Assignee: Columbia Sportswear North America, Inc., Portland, OR (US)

(*) Notice: Subject to any disclaimer, the term of this patent is extended or adjusted under 35 U.S.C. 154(b) by 300 days.

(21) Appl. No.: 12/939,075

(22) Filed: Nov. 3, 2010

(65) Prior Publication Data
US 2011/0119295 A1 May 19, 2011

Related U.S. Application Data

(60) Provisional application No. 61/258,168, filed on Nov. 4, 2009.

(51) Int. Cl.
*G06F 17/30* (2006.01)
(52) U.S. Cl.
USPC ........... 707/772; 707/706; 707/758; 705/330; 705/500
(58) Field of Classification Search
None
See application file for complete search history.

(56) References Cited

U.S. PATENT DOCUMENTS

| | | | |
|---|---|---|---|
| 7,277,866 B1* | 10/2007 | Or-Bach et al. | 705/28 |
| 2003/0141976 A1* | 7/2003 | Dickinson et al. | 340/572.8 |
| 2004/0133484 A1* | 7/2004 | Kreiner et al. | 705/28 |
| 2004/0146832 A1* | 7/2004 | Lampert | 433/102 |
| 2005/0038758 A1* | 2/2005 | Hilbush et al. | 705/402 |
| 2005/0285386 A1* | 12/2005 | Dickinson | 283/81 |
| 2006/0089841 A1* | 4/2006 | McKnight | 705/1 |
| 2007/0095905 A1* | 5/2007 | Kadaba | 235/384 |
| 2007/0276686 A1* | 11/2007 | Hunscher et al. | 705/1 |
| 2009/0007525 A1* | 1/2009 | Lewis et al. | 53/474 |
| 2009/0302099 A1* | 12/2009 | DeLaVergne | 229/305 |
| 2010/0063887 A1* | 3/2010 | Kranz et al. | 705/17 |
| 2010/0153220 A1* | 6/2010 | Hamm | 705/16 |

* cited by examiner

*Primary Examiner* — Hung Le
(74) *Attorney, Agent, or Firm* — Schwabe, Williamson & Wyatt, P.C.

(57) ABSTRACT

Disclosed are methods, apparatus, systems, and non-transitory, tangible computer-readable media associated with utilizing a central storage and maintainer which has knowledge of one or more reusable boxes, and maintains information about the boxes. The system maintains reusable box information with respect to a unique identifier or tracking code which is associated with each tracked box. The association between a unique identifier and a box allows future shipping using the box to be tracked using the identifier. This enables a narrative of the box's travels to be developed through the addition of narrative entries or comments provided by recipients of the box. The narrative may in turn be searched for and displayed via one or more web-based interfaces, providing a snapshot of the box's travels.

17 Claims, 9 Drawing Sheets

Reusable Packaging History System

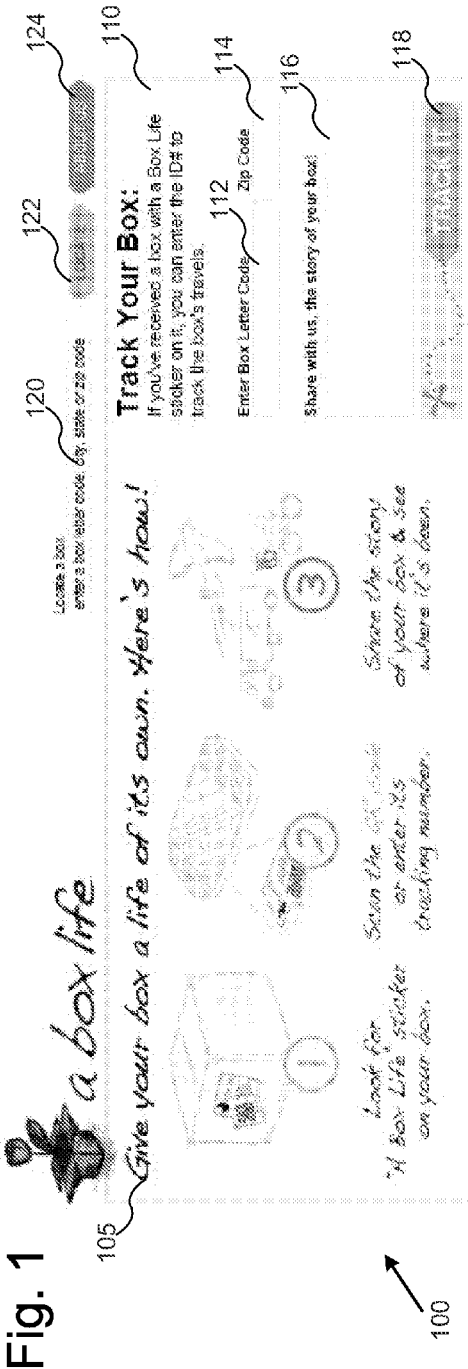
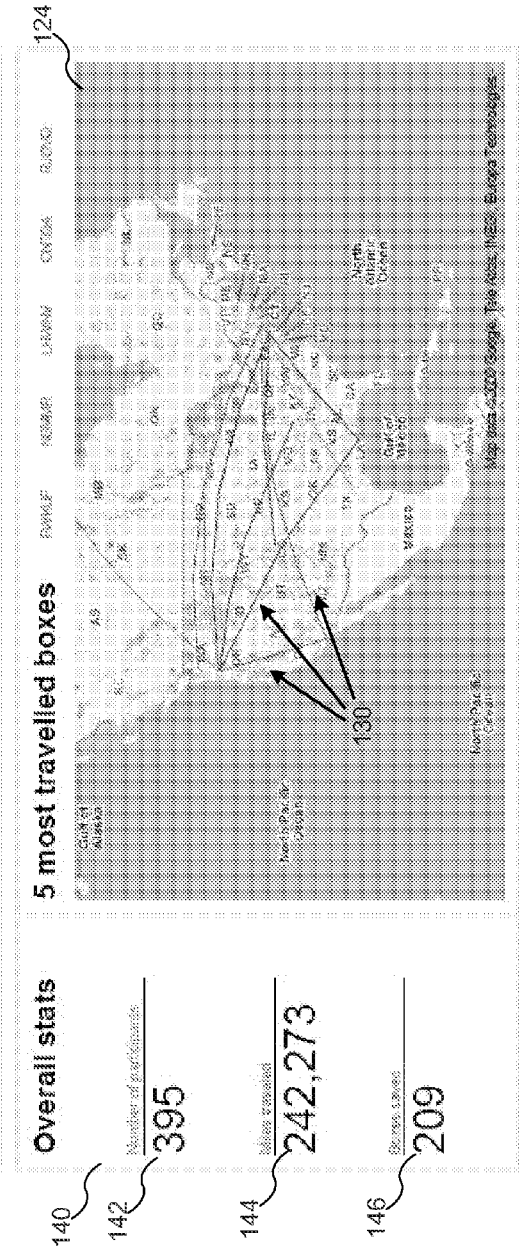
Fig. 1

REUSABLE PACKAGING HISTORY TRACKING SYSTEM AND QUERY INTERFACE

RELATED APPLICATIONS

This application claims benefit of U.S. Provisional Application 61/258,168, filed Nov. 4, 2009, entitled "Reusable Packaging History Database and Interface."

TECHNICAL FIELD

Embodiments of the present invention relate to the tracking of reusable packaging, and in particular to maintaining a history of reusable packaging through the use of per-package identifying codes maintained in a searchable database and an interface for searching the same.

BACKGROUND

In current retail shipping techniques, many products are shipped in one-time-use packaging. For example, many plastic bags or boxes, even when they are made of recyclable materials, must be destroyed to access the products inside. This can cause undesired waste, requiring new shipping packaging for every product shipped. And even in scenarios where reusable packing is utilized, recipients of a product in reusable packaging may not realize the packaging is reusable or may not easily see the benefit of reusing the packaging to save resources. This results in an underutilization of reusable packaging materials, and leads to overuse of virgin raw packaging materials.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 1 illustrates an online interface for obtaining packaging history information in accordance with various embodiments.

DETAILED DESCRIPTION OF EMBODIMENTS

Figure 2:
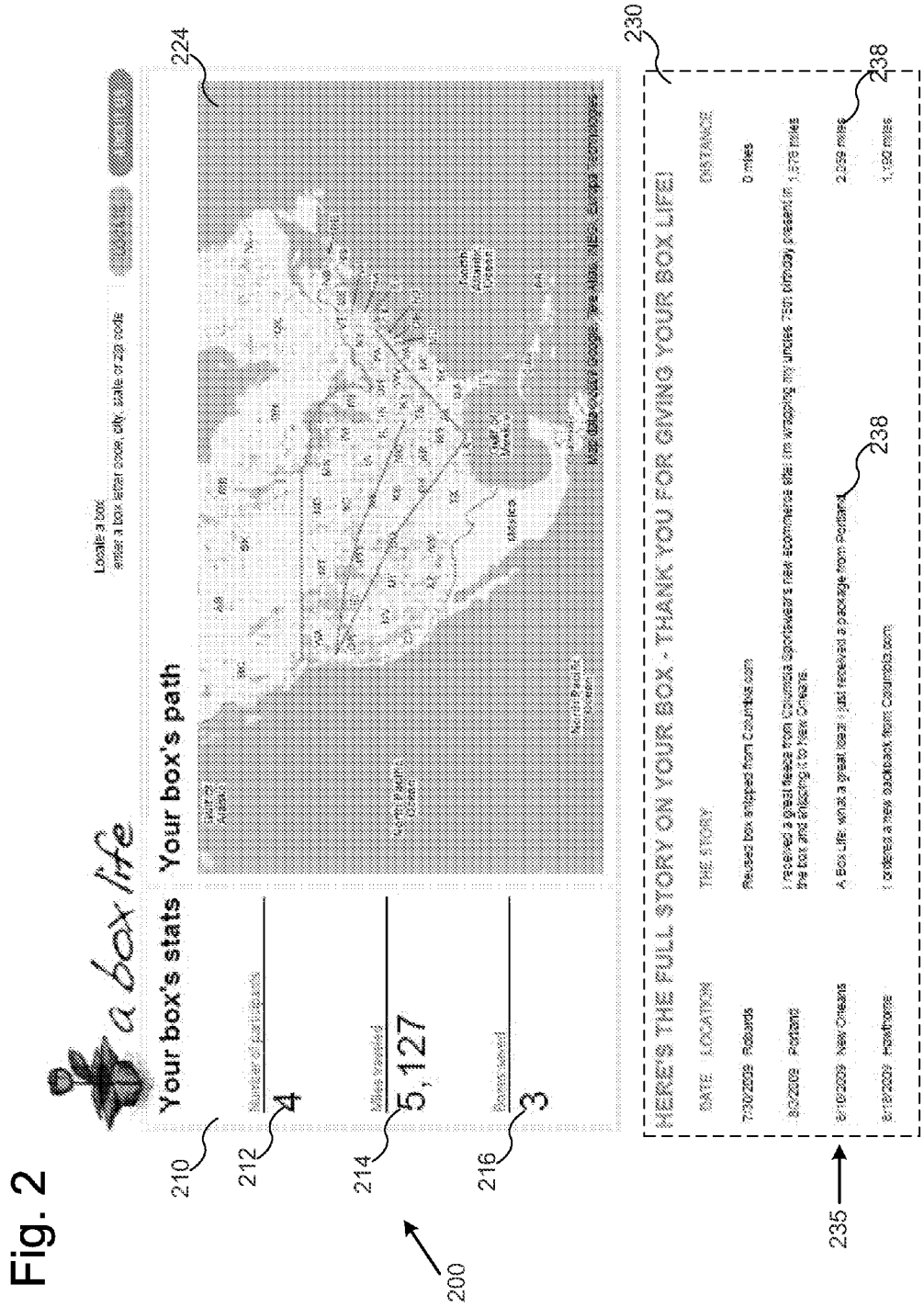
FIG. 2 illustrates an online report of history for a particular reusable package in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scopes of embodiments, in accordance with the present disclosure, are defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. The description may also use the phrases "in an implementation," or "in an alternative implementation," which may each refer to one or more of the same or different implementation details of various embodiments described herein. Furthermore, the terms "comprising," "including," "having," and the like, as used with respect to embodiments or implementations of the present invention, are synonymous. The term "exemplary" is used herein merely illustrates that an example is being shown or described and is not intended to denote that any so-described feature is preferred or required over any other. Additionally, while flowcharts and descriptions of processes may make reference to particular steps, it should be understood that, in alternative implementations, the illustrated steps may be combined or divided into two or more sub-steps.

Implementations and embodiments are described herein with reference to a "reusable box" or a "box." While this language is used as an example of reusable packaging for the sake of readability, various implementations described herein may be utilized with other reusable packaging, and the usage of the "box" terminology is not intended to suggest that the following techniques are limited solely to boxes. Additionally, while particular interface implementations are described and illustrated herein, they are not meant to imply any particular requirements or limitations on the interfaces which may be used. Instead, they are included as examples which illustrate particular implementations of the techniques and systems discussed herein.

Various implementations utilize a central storage and maintainer which has knowledge of one or more reusable boxes, and maintains information about the boxes. The system maintains reusable box information with respect to a unique identifier or tracking code which is associated with each tracked box. The association between a unique identifier and a box is intended to live beyond the delivery of the box such that, even after delivery, future shipping using the box may be tracked using the identifier. This enables a narrative of the box's travels to be developed through the addition of narrative entries or comments provided by recipients of the box. The narrative may in turn be searched for and displayed via one or more web-based interfaces, providing a snapshot of the box's travels, giving it a sense of having an ongoing "life."

By providing a facility for developing the box's life, the system encourages recipients to reuse the box for future shipping. As these future shipments are also tracked, statistics may also be developed regarding resource savings which are provided by the continued reuse of the box. Through this tracking and reporting, recipients are encouraged to reuse boxes and to avoid using new materials for packaging.

FIG. 1 illustrates one implementation of a web-based interface 100 to access and add to the reusable packaging history system; in the illustration, the system is named "a box life." The interface may be implemented, in one embodiment, as a web page which is accessible to the public via a variety of standard web browsers. The exemplary launching interface displays, in its upper-left corner, one implementation of basic directions, including explanatory illustrations, which explain how to use the reusable packaging history system. While various implementation details of system use are described below, the example illustrations show, at a basic level, a three-step process for a recipient:

1) a recipient receives a box having a special "A Box Life" sticker;
2) the recipient either scans a code from the sticker using a scanning device, or directly enters a code from the sticker into the web interface; and
3) the recipient enters information about the box, and is able to see where the box has been.

The exemplary web-based interface of FIG. 1 also displays a box-tracking panel 110 in its upper-right corner, here titled "Track Your Box," which allows a recipient to track a box that he or she has received. The illustrated implementation of the box-tracking panel allows the box's code to be entered at entry element 112, along with an indication of a location where the box was received (here implemented as a zip code) at entry element 114 and a comment about the box at entry element 116. While particular implementations illustrated herein may be described with reference to particular geographical locales, for example using zip codes to refer to locations in the United States, in various embodiments, other indications of location may be used such as non-U.S. postal codes, latitude and longitude coordinates, or other indicators. In various embodiments, the system and techniques descried herein may be utilized in whole or in part outside of the United States, as well. As will be explained herein, after the "Track It" button 118 is pressed, the previously-entered information may be submitted to and stored in a reusable packaging history database. In other embodiments, the box-tracking panel may provide for more or less information to be entered, such as, for example, an identifier of the recipient. In other embodiments, the interface may allow information to be entered before sending a box, as contrasted with submission after its receipt.

FIG. 1 also illustrates an exemplary search box 120, in this implementation located above the box-tracking panel 110, which allows a user to enter search criteria for a box, and to submit a search query based on this search, such as by activating a search element, such as the "Locate" element 122. As illustrated, in various embodiments, such search criteria can include a box letter code, such as that displayed on the sticker discussed above, a city or state designation, or a zip code. In alternative implementations, additional search criteria may be supported and may depend on the information maintained by the reusable packaging history database.

The exemplary web-based interface 100, as illustrated in FIG. 1 also shows overall information and statistics for multiple boxes tracked by the reusable packaging history system. For example, in the lower-right corner of the illustrated interface, a map 124 is displayed showing travel pathways, such as pathways 130 for the five most-traveled boxes known to the system. In one implementation, different colors are used for the different pathways, and are associated with displayed tracking codes for the boxes (which are, in FIG. 1, illustrated above the map).

In addition to the map, in the lower-left corner the illustrated interface displays a statistic panel 140 with "Overall Stats" for boxes in the system. As illustrated, this may include a total number of participants 142, a total number of miles 144 traveled by all reusable boxes which are tracked by the system, and a "boxes saved" metric 146. In one implementation, this "boxes saved" metric 146 may include the number of additional trips each box takes after its initial deployment. Thus, if a box used initially to ship a retail purchase and is then used by the recipient of that purchase to ship another good to a third party, it may be assumed that reuse of the box saved on the procurement of a second box for the shipment to the third party. A box may therefore be considered to be "saved" in this metric. In various embodiments, such a metric may also be referred to as a "boxes reused" metric. Additionally, in various embodiments, the "boxes reused" and/or "boxes saved" metrics may incorporate boxes sent from one or more retailers. In various embodiments, the metrics may be calculated based on reporting from the one or more retailers, or may be based on a number of labels produced with tracking codes printed on them, as described herein. In another embodiment, the system may report a "boxes tracked" metric, which details a total number of boxes tracked in the system. This metric may be different than the "boxes reused" or "boxes saved" metric. For example, not all boxes which are known to have tracking numbers may have had their tracking codes input into the system by recipients.

In other implementations, other metrics may be calculated and displayed to users. For example, if a quantitative measure can be determined for an amount of carbon dioxide (or other by-product) for which production is avoided by the re-use of a box, then the system may be able to display the total amount of carbon dioxide saved over all tracked reusable boxes. These statistics and illustrations seek to improve participation in the reusable packaging history system by illustrating the collective benefit of reusing boxes in the system.

FIG. 2 illustrates a second web-based interface 200 for providing a report of a particular reusable box's travels during its "life." While particular metrics, illustrations, and narratives are illustrated in the report of FIG. 2, in alternative implementations more or fewer pieces of information regarding the box may be shown.

The interface 200 illustrated in FIG. 2 may be obtained, for example, after entering a tracking code into the interface 100 of FIG. 1, or alternatively through searching for a box through the search interface illustrated in FIG. 1. In a manner similar to that in FIG. 1, the interface of FIG. 2 may illustrate metrics about the tracked box, such as in the illustrated metrics panel 210. For example, FIG. 2 may illustrate that, for this tracked box, a metric 212 for how many people have participated in tracking the box, a metric 214 showing the distance that the box has traveled, and a metric 216 for how many boxes have been "saved" by that particular reusable box. Additionally, the interface may show a map 224 of the box's travels over its "life."

In addition to metrics and illustrations of the box's pathway, the interface of FIG. 2 also illustrates a narrative history 230 of the box as it has traveled and as participants have entered narrative entries describing the box's travels. For example, in the illustrated narrative history 230, the third entry 235 was entered by a recipient who received the box on Aug. 10, 2009 in New Orleans, La. The recipient, upon receiving the box, entered the tracking code from a label or sticker affixed to the box (or scanned a code from the label) and entered his or her location. The recipient also added the narrative entry 238, which read "A Box Life, what a great idea! I just received a package from Portland." In addition to displaying this narrative entry, the reusable packaging history system has also computed the distance traveled between the last known location of the box and this entry's location of New Orleans, and has included that in its report as distance metric 239. Between the narrative-based report, the metrics, and the illustration of the box's travels, the interface provides a rich report of the box's movements over time.

Figure 3:
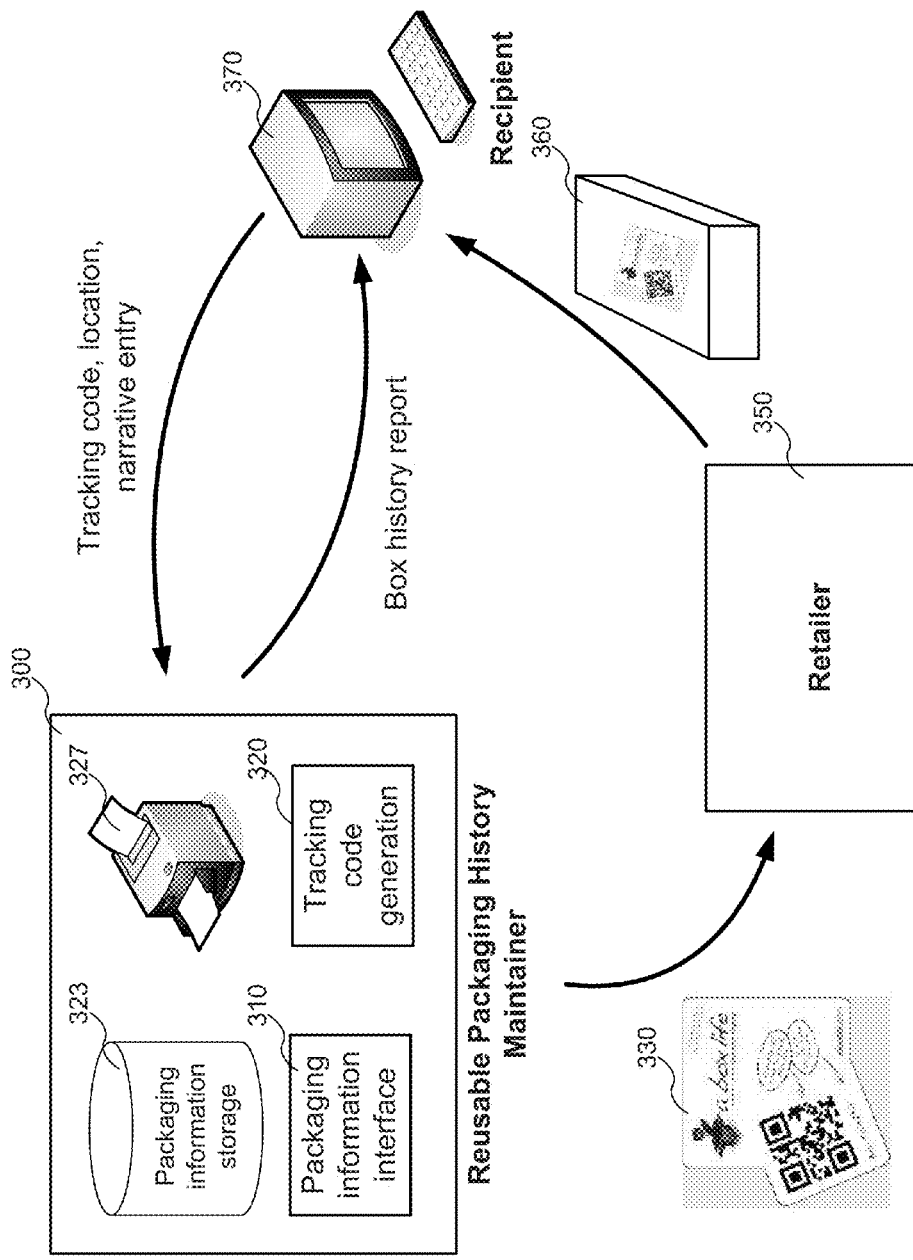
FIG. 3 is a block diagram illustrating information flows and relationships between entities in a reusable packaging history system in accordance with various embodiments.

FIG. 3 is a block diagram illustrating information flows and relationships between entities in the reusable packaging history system. The three major entities illustrated are a reusable packaging history maintainer 300, a retailer 350 who may sell goods using the reusable boxes, and a recipient 370 who may receive the goods in the boxes. As the figure illustrates, in one implementation, the reusable packaging history maintainer 300 may comprise a packaging information storage 323 which holds both package history information and unique identifiers which are associated with each reusable package. In various embodiments, the packaging information storage may comprise a database, a server, removable storage, or other forms of information storage. In various embodiments, the reusable packaging history maintainer may also comprise a packaging information interface module 310. This packaging information interface 310 module may generate, in various embodiments, web-based interfaces to provide reusable packaging history information to recipients of packages. In various embodiments, the packaging information interface 310 may also receive queries and direct searches of information contained in the packaging information storage 323.

The reusable packaging history maintainer 300 may also comprise a tracking code generation module 320, which may, in various embodiments, generate unique tracking codes which may be associated with reusable packages. In some embodiments, the tracking code generation module 320 may direct printing of labels which display the code, such as label 330, on printer 327. In various embodiments, these tracking codes may be encoded in different forms, such as in alphabetic, numeric, or alphanumeric codes, or through two-dimensional codes, such as, for example, a QR code. In various embodiments, the printed labels may be provided to the retailer 350 who, in turn, takes the labels provided to it by the reusable packaging history maintainer 300 and affixes them to reusable boxes, which it then uses to ship goods to the recipient 370.

In an alternative embodiment, the reusable packaging history maintainer 300 may also serve as the retailer 350 by maintaining history information for its own shipped goods. In an alternative embodiment, the box history maintainer 300 may interact with multiple retailers, providing a centralized store and interface for reusable packaging history information. Through this technique, a reusable packaging history maintainer may be able to encourage reuse of boxes by retailers that might not otherwise have the resources or inclination to support such a system on their own.

As FIG. 3 illustrates, after the recipient 370 receives the box and decides to utilize the reusable packaging history system, he or she sends a query to the reusable packaging history maintainer 300. In one embodiment, this query uses an interface such as the web-based interface 100 illustrated in FIG. 1. Thus, in one embodiment, the tracking code (obtained from the label), location of receipt, and a narrative entry are sent by the recipient 370 to the reusable packaging history maintainer 100, such as through the web-based interface 100. After the maintainer enters this information into the reusable packaging database, the maintainer responds to the query with a narrative history, such as narrative history 230 illustrated in the web-based interface 200 of FIG. 2.

Figure 4:
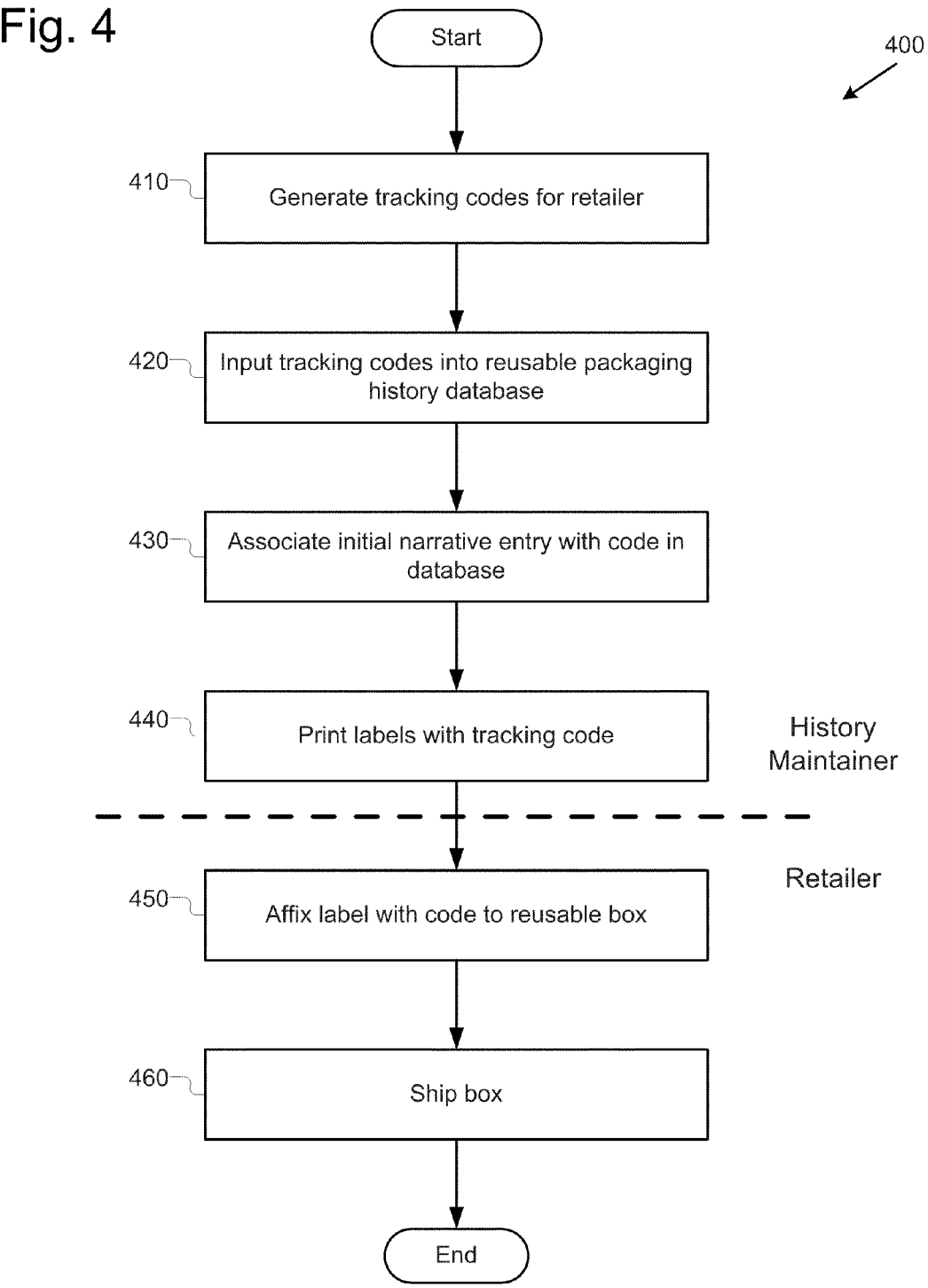
FIG. 4 is a flowchart illustrating an exemplary process for associating reusable packaging with the reusable packaging history system of FIG. 3 in accordance with various embodiments.

FIG. 4 is a flowchart illustrating an exemplary process 400 for associating reusable packaging with the reusable packaging history system of FIG. 3. In the illustrated embodiment, actions performed by a the reusable packaging history maintainer 300 are illustrated separately from those performed by the retailer 350; however, in alternative embodiments, all actions may be performed by a single entity or may be split up among multiple entities, including those not illustrated. The process of FIG. 4 starts at operation 410, where the reusable packaging history maintainer 300 may generate one or more tracking codes for the retailer 350. In various embodiments, this generation may be performed by the tracking code generation module 320. In one embodiment, these codes may be generated to be unique from all other tracking codes. In various embodiments, the codes may be identical to unique identifiers used internally in the reusable packaging database, or may be associated with internal identifiers, such as through encoding the identifiers, or by other means. In one embodiment, the tracking codes are in the form of an alphabetic or alphanumeric codes.

Next, at operation 420, the reusable packaging history maintainer 300 inputs the tracking codes into the packaging history storage. In various embodiments, this inputting may be performed by the packaging information interface 310, or by other modules. Next, at operation 430, the reusable packaging history maintainer 300 may associate an initial narrative entry with each of the codes. The maintainer does this, in one implementation, in order to provide a starting point for the boxes which will be tracked by these codes. Thus, for a retailer in Portland, Oreg., the maintainer may submit an entry for each code that says "Shipped from Portland, Oreg." The maintainer may also, in various implementations, associate the code with the location or retailer from which boxes will be shipped and/or associate the codes with a particular time.

At operation 440, the maintainer may then print tracking labels, such as the label 330 illustrated in FIG. 3, containing the tracking codes. In one implementation the codes may be printed directly on the labels. In another, the tracking codes may be first encoded so that they may be automatically scanned. For example, the labels of FIGS. 1 and 3 contain scannable two-dimensional QR codes which contain the codes. In such an implementation, the QR code (or other scannable code) may contain additional information, such as a URL of the web-based interface of FIG. 1, to facilitate automated navigation to the interface and quick entry of the code by a user. In alternative implementations, the maintainer may not print labels at all, but instead may print codes directly onto boxes, or may provide the codes directly to the retailer for printing and inclusion by the retailer.

After the labels are printed, they may be provided to the retailer. In other embodiments, the retailer may generate the label in coordination with the reusable packaging history maintainer. At operation 450, the retailer may then affix the labels to reusable boxes, thereby associating each box with its tracking code. Finally, at operation 460, the retailer may ship the reusable box, along with purchased goods, to a recipient.

Figure 5:
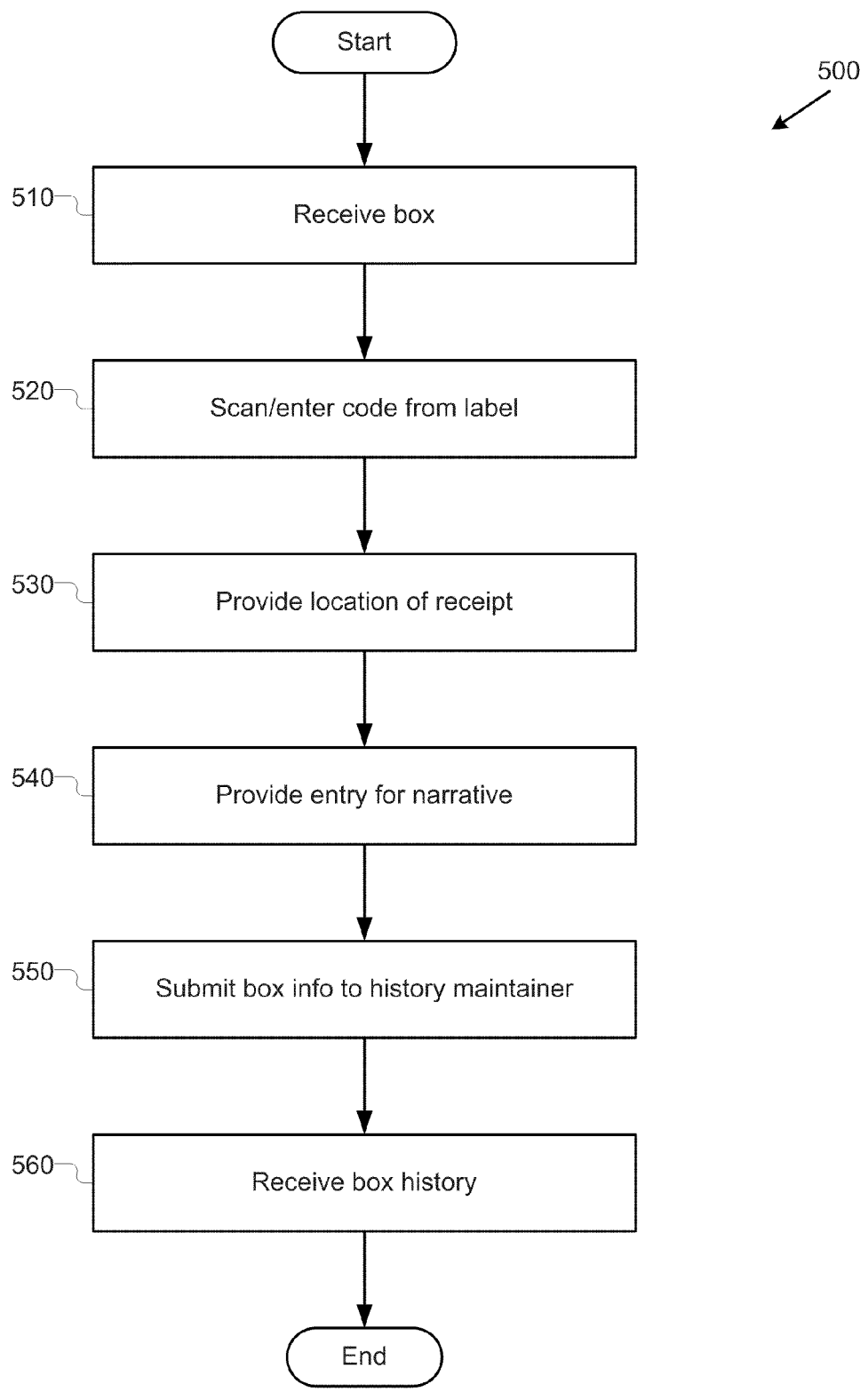
FIG. 5 is a flowchart illustrating an exemplary process for updating a reusable packaging history database with additional information for a package in accordance with various embodiments.

FIG. 5 is a flowchart illustrating an exemplary process 500 for a recipient of a box to update the reusable packaging history maintainer with additional information for the box. The process may begin at operation 510, when the recipient receives the reusable box with the tracking code on it. Next, at operation 520, the recipient may scan the code, if the box label contains a scannable code, or may manually enter the code into a web-based tracking interface, such as web-based interface 100. In one embodiment, the recipient may scan the code using a laser-based scanner; in another, a photo of the scannable code may be taken by the recipient, which is then processed by software to identify the code. Additionally, when a recipient scans the code, the recipient's device may cause automatic navigation to the web-based reusable box tracking interface, optionally including automatically entering the tracking code for the recipient.

Next, at operation 530, the recipient may provide the location of the receipt to the interface. The recipient may then provide an entry for the box's narrative at operation 540. The recipient may then, at operation 550, submit the box information to the reusable packaging history maintainer 300, for example by clicking the "Track It" button 118 illustrated in FIG. 1. Finally, the recipient may receive a narrative history, for example the narrative history 230 illustrated in FIG. 2. The process may then end.

Figure 6:
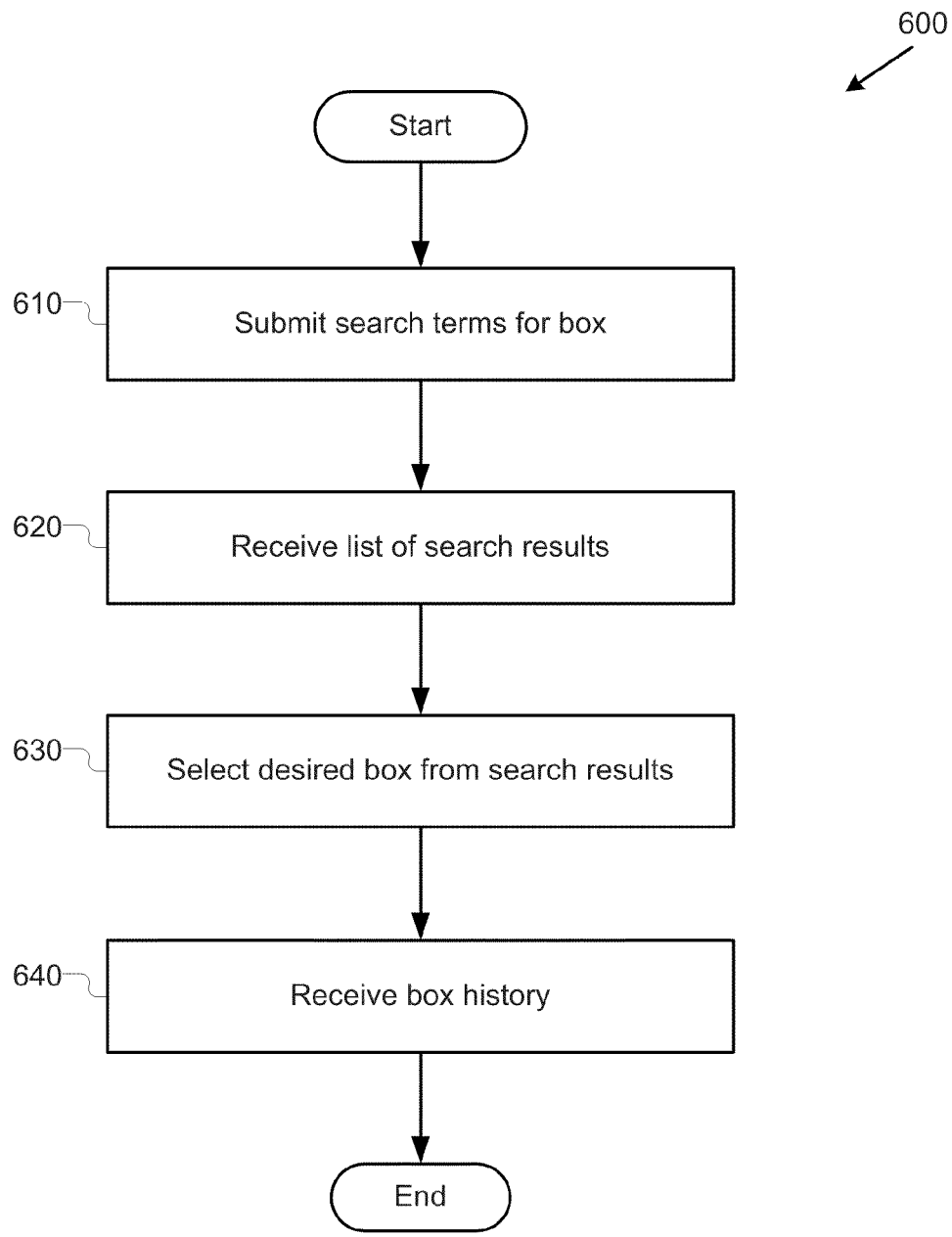
FIG. 6 is a flowchart illustrating an exemplary process for searching for tracked packaging items in accordance with various embodiments.

FIG. 6 is a flowchart illustrating an exemplary process for searching for tracked packaging items. In various implementations, the process may be initiated by a recipient of a box, or by a third-party user who does not have possession of a tracked box. For the sake of simplicity, the process will be described as being at the direction of a "user." The process may begin at operation 610 when the user submits search terms for a box. As discussed previously, in various implementations, these search terms or criteria could include a tracking code, an indication of a location (such as city and/or state), a name, time-based criteria, retailer information and/or product information. In one implementation, these terms are entered such as through the search box 120 illustrated in FIG. 1.

Figure 7:
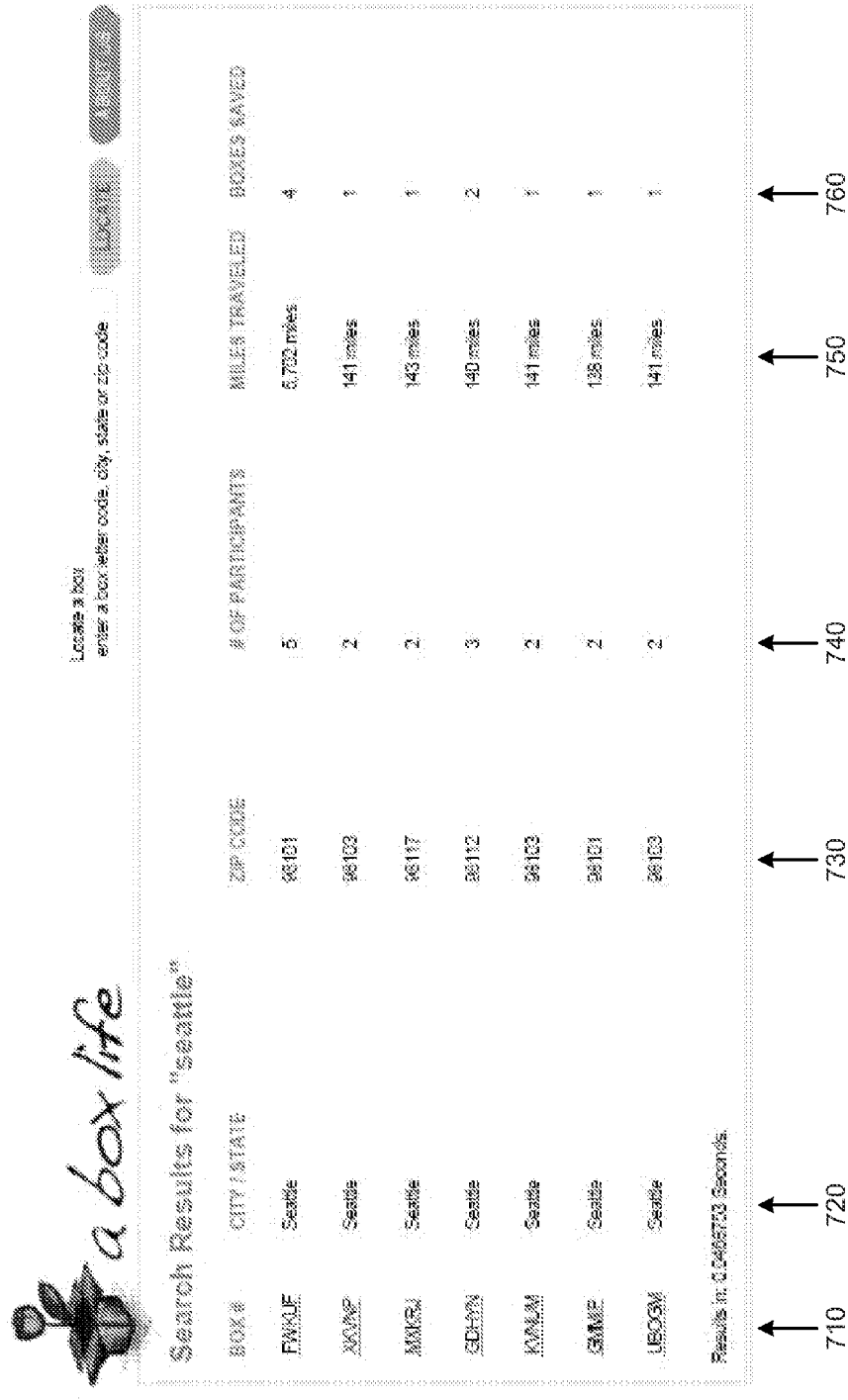
FIG. 7 illustrates an online interface for reporting results of a search for packaging items in accordance with various embodiments.

Next, at operation 620 the user may receive, from the reusable packaging history maintainer 300, a list of search results. FIG. 7 illustrates one implementation of a web-based interface 700 reporting results for a search for the term "seattle". In the illustrated embodiment, seven tracked boxes are displayed, as well as additional information for each box. In the illustrated report, this information includes a box's tracking code (710), its city and/or state (720), its shipping zip code (730), the number of people who have participated in the box's travels (740), its total number of miles traveled (750), and the number of boxes that have been "saved" through reuse of the box (760). Alternative embodiments may display more or fewer pieces of information about each returned box. Returning to FIG. 6, at operation 630 the user may select which box he or she desires to receive a full report on. In one embodiment, the user may do this by clicking on a hyperlink associated with the box, such as the box tracking codes 710 illustrated in FIG. 7. Finally, at operation 640, the user may receive a report, including the history for the selected box through a web-based interface, such as interface 200 of FIG. 2.

Figure 8:
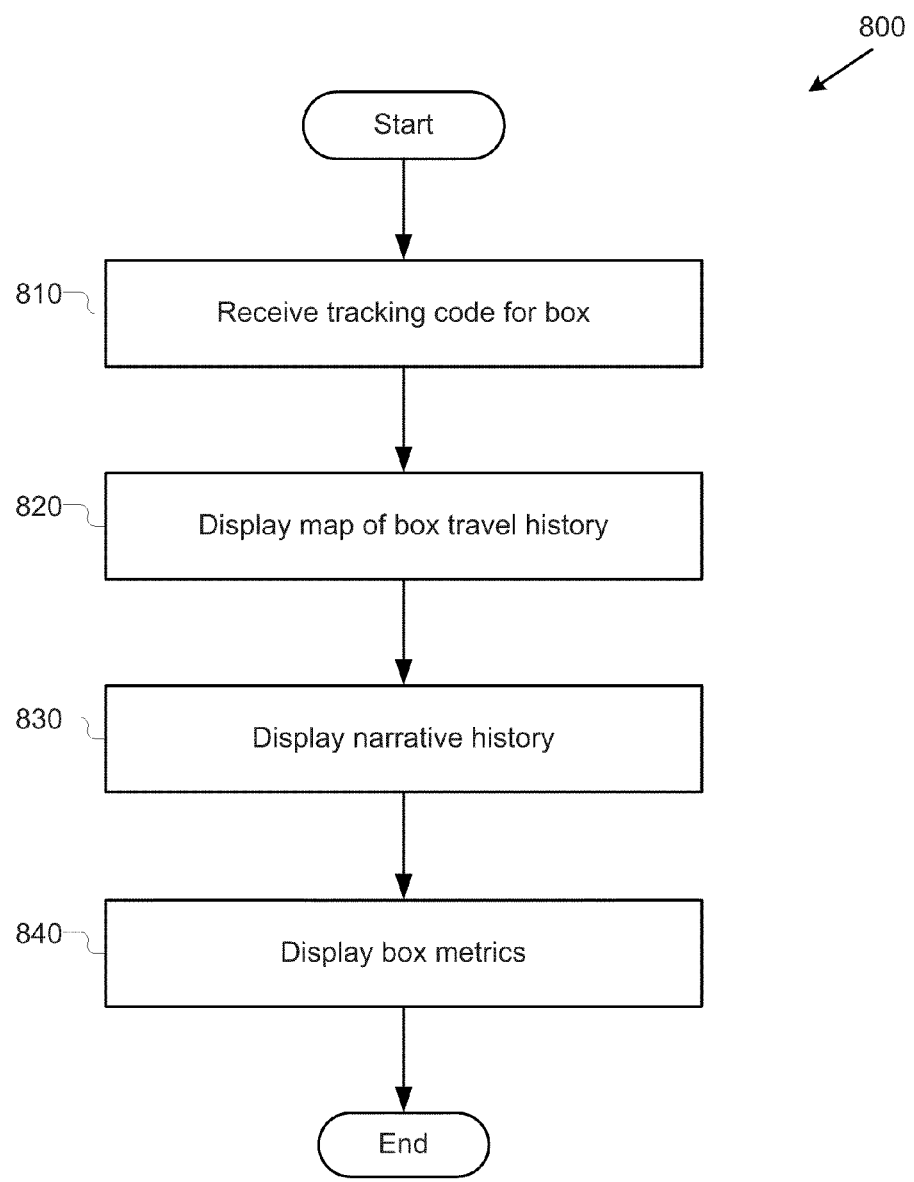
FIG. 8 is a flowchart illustrating an exemplary process for responding to a query about a reusable package in accordance with various embodiments.

FIG. 8 is a flowchart illustrating an exemplary process for the reusable packing history maintainer 300 to respond to a query about a reusable package. The process may begin at operation 710, where the reusable packing history maintainer 300 receives a tracking code for a box, such as through an interface provided by packaging information interface 310. At operation 720, packaging information interface 310 may display a map of travel history, such as map 224 illustrated in FIG. 2. In various embodiments, while displaying the map, the packaging information interface 310 may additionally display travel paths that the searched-for box has taken. Next, at operation 730, the packaging information interface 310 may display a narrative history, such as the narrative history 230 illustrated at FIG. 2. At operation 740, the packaging information interface 310 may then display metrics about the box, such as in the metrics panel 210 illustrated at FIG. 2. The process may then end.

Figure 9:
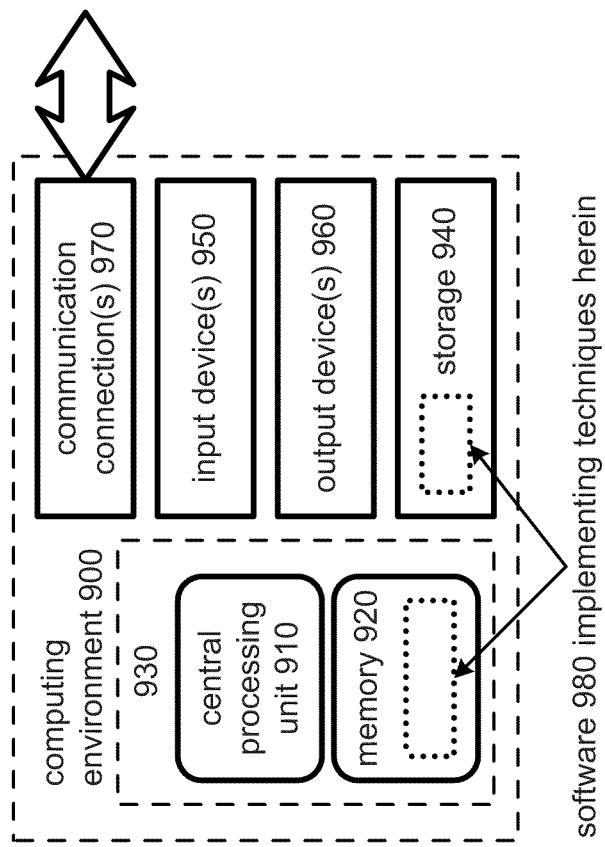
FIG. 9 is a block diagram illustrating a generalized example of a computing environment on which several of the described embodiments may be implemented.

FIG. 9 illustrates a generalized example of a suitable computing environment (900) in which several of the described embodiments may be implemented. The computing environment (900) is not intended to suggest any limitation as to scope of use or functionality, as the techniques and tools may be implemented in diverse general-purpose or special-purpose computing environments such as personal computers, consumer electronic devices, and the like.

With reference to FIG. 9, the computing environment (900) includes at least one CPU (910) and associated memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing the techniques described herein.

A computing environment may have additional features. For example, the computing environment (900) includes storage (940), one or more input devices (950), one or more output devices (960), and one or more communication connections (970). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, DVDs, flash drives, disk arrays, or any other medium which can be used to store information and which can be accessed within the computing environment (900). The storage (940) stores instructions for the software.

The input device(s) (950) may be a touch input device such as a keyboard, mouse, pen, or trackball, a voice input device, a scanning device, or another device that provides input to the computing environment (900). For audio or video encoding, the input device(s) (950) may be a sound card, video card, TV tuner card, or similar device that accepts audio or video input in analog or digital form, or a CD- or DVD-based drive that reads audio or video samples into the computing environment (900). The output device(s) (960) may be a display (e.g., monitor, display screen, or the like), printer, speaker, DVD-writer, or another device that provides output from the computing environment (900).

The communication connection(s) (970) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of non-transitory computer-readable media. Computer-readable media are any available media that can be accessed within a computing environment. By way of example, and not limitation, with the computing environment (900), computer-readable media include memory (920), computer-readable storage media (940) (e.g., CDs, DVDs, diskettes, flash drives, removable hard drives, hard drive arrays), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "respond," "query," and "search" to describe computer operations in a computing environment. These terms are high-level abstractions for operations performed by a computer, and should not be confused with acts performed by a human being. The actual computer operations corresponding to these terms vary depending on implementation.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A computer-implemented method for maintaining information about reusable packaging, the method comprising:
    generating, by a computing device, a unique tracking code, the tracking code to be associated with a reusable package;
    storing, by the computing device, information about the reusable package, the information associated with the tracking code;
    receiving, by the computing device, information about the reusable package from a recipient of the reusable package, the information associated with the tracking code and including a location where the recipient received the reusable package; and
    in response to receipt of the information, returning to the recipient who provided the information, by the computing device, a web page displaying a location history for the reusable package, the location history including one or more locations at which the reusable package has been delivered to previous recipients of the reusable package, as well as the location where the recipient who provided the information received the reusable package.

2. The method of claim 1, wherein receiving information about the reusable package further comprises receiving, by the computing device, a narrative entry for the reusable package.

3. The method of claim 1, wherein returning a web page including the location history for the reusable package comprises returning a map showing one or more locations in the location history for the reusable package.

4. The method of claim 1, wherein storing information about the reusable package comprises storing, by the computing device, an initial location for the reusable package in the location history for the reusable package.

5. The method of claim 1, wherein storing information about the reusable package comprises:
    calculating one or more travel metrics for the reusable package based on the location history; and
    storing the one or more travel metrics as associated with the tracking code.

6. The method of claim 1, wherein storing information about the reusable package comprises storing an initial narrative for the package before it is first shipped.

7. The method of claim 1, further comprising:
    receiving, by the computing device, a search query containing information other than a tracking code; and
    responding to the search query with indications of one or more reusable packages for which information has been stored.

8. A system for tracking reusable packaging, the system comprising:
    one or more computer processors;
    a packaging information storage coupled to the one or more computer processors and configured to store respective tracking codes and respective package history information for one or more reusable packages, the respective package history information including respective location history information;
    a packaging information interface module coupled to the one or more computer processors and configured to:
        receive, from a first recipient, at a first location, reusable packaging history information for a reusable package, the reusable packaging history information associated with a tracking code for the first package and including a location where the recipient received the reusable package;
        cause the reusable packaging history information storage to store the received reusable packaging information for the reusable package;
        receive a query from a second recipient, who received the reusable package at a second location, for reusable packaging history information for the reusable package, the query including a tracking code for the reusable package; and
        return a web page to the second recipient showing all or part of the reusable packaging history information which has been stored in the packaging information storage for the reusable package, including location history information including the first location at which the reusable package was delivered to the first recipient, as well as a location at which the second recipient received the reusable package.

9. The system of claim 8, wherein the system further comprises a tracking code generation module configured to:
    generate one or more unique tracking codes for reusable packages; and cause the packaging information storage to store the tracking codes.

10. The system of claim 8, further comprising a tracking code printer configured to print one or more labels displaying the tracking codes, the labels configured to be affixed to reusable packaging.

11. The system of claim 10, wherein the tracking code printer is configured to print two-dimensional codes which contain the tracking code on the one or more labels.

12. The system of claim 8, wherein the packaging information interface module is further configured to:
   generate one or more metrics based on location history information stored in the packaging information storage;
   cause the packaging information storage to store the one or more metrics; and
   return one or more metrics about the reusable package when returning the web page showing all or part of reusable packaging history information which has been stored in the packaging information storage for the second reusable package.

13. An article of manufacture, comprising:
   a tangible computer-readable storage medium; and
   a plurality of computer-executable instructions stored on the tangible computer-readable storage medium, wherein the computer-executable instructions, in response to execution by an apparatus, cause the apparatus to perform operations for maintaining information about reusable packaging, the operations including:
      generating a unique tracking code, the tracking code to be associated with a reusable package;
      receiving history information about the reusable package, the history information including location history information received from a recipient of the reusable package and a location where the recipient received the reusable package and associated with the unique tracking code;
      storing the history information about the reusable package, the history information associated with the unique tracking code; and
      in response to receipt of the history information, returning a web page comprising a location history for the reusable package including one or more locations at which the reusable package has been delivered to previous recipients of the reusable package.

14. The article of claim 13, wherein:
   receiving history information about the reusable package further comprises receiving a narrative entry for the reusable package, the narrative entry associated with the tracking code.

15. The article of claim 13, wherein returning a web page comprises the computing device returning a map showing one or more locations found in the location history for the reusable package.

16. The article of claim 13, wherein storing the history information about the reusable package comprises:
   calculating one or more travel metrics for the reusable package; and
   storing the one or more travel metrics as associated with the tracking code.

17. The article of claim 13, wherein storing history information about the reusable package comprises storing an initial narrative for the package before it is first shipped.

* * * * *